United States Patent
Satula

(10) Patent No.: US 6,667,350 B1
(45) Date of Patent: Dec. 23, 2003

(54) CALCIUM BORATE INFUSED FOAM BUILDING MATERIALS AND THE LIKE AND METHOD OF MAKING SAME

(75) Inventor: George G. Satula, New Berlin, WI (US)

(73) Assignee: Plymouth Foam, Incorporated, Plymouth, WI (US)

(*) Notice: Subject to any disclaimer, the term of this patent is extended or adjusted under 35 U.S.C. 154(b) by 0 days.

(21) Appl. No.: 10/272,882

(22) Filed: Oct. 17, 2002

(51) Int. Cl.⁷ .............................. C08J 9/224; C08J 9/16; C08J 9/40
(52) U.S. Cl. ............................ 521/57; 521/79; 521/81; 521/85
(58) Field of Search ........................... 521/85, 79, 81, 521/57, 146, 60

(56) References Cited

U.S. PATENT DOCUMENTS

| | | | |
|---|---|---|---|
| 3,493,460 A | | 2/1970 | Windecker |
| 3,822,331 A | | 7/1974 | Cogliano |
| RE30,193 E | * | 1/1980 | O'Shaunessy |
| 4,182,799 A | | 1/1980 | Rodish |
| 4,211,739 A | | 7/1980 | Phipps |
| 4,272,469 A | | 6/1981 | Smith |
| 4,447,491 A | | 5/1984 | Bradbury et al. |
| 4,532,261 A | | 7/1985 | Rühl et al. |
| 4,564,554 A | | 1/1986 | Mikuski |
| 4,587,164 A | | 5/1986 | Freeman |
| 4,721,588 A | | 1/1988 | Burchard et al. |
| 4,924,641 A | | 5/1990 | Gibbar, Jr. |
| 4,942,084 A | | 7/1990 | Prince |
| 5,057,545 A | | 10/1991 | Muhl et al. |
| 5,194,323 A | | 3/1993 | Savoy |
| 5,270,108 A | | 12/1993 | Savoy |
| 5,373,674 A | | 12/1994 | Winter, IV |
| 5,457,136 A | * | 10/1995 | Hartranft et al. |
| 6,113,374 A | | 9/2000 | Brackman et al. |
| 6,387,300 B1 | | 5/2002 | Bosserman |

FOREIGN PATENT DOCUMENTS

| | | |
|---|---|---|
| GB | 1474557 | 5/1977 |
| GB | 2201175 A | 8/1988 |
| JP | 51-059964 | 5/1976 |
| JP | 54-048877 | 4/1979 |
| JP | 55-055855 | 4/1980 |
| JP | 55-055856 | 4/1980 |
| JP | 55-091658 | 7/1980 |
| JP | 55-095557 | 7/1980 |
| JP | 63-264670 | 11/1988 |

OTHER PUBLICATIONS

Donald L. Murray & H. Harro Hassel, The Manufacture of Foam Products From Extruded Foam Using the Direct Gas Process.

Battenfeld Gloucester, Tandem Foam Extrusion Systems, Gloucester, Massachusettes, USA.

BASF Wyandotte Corporation, EPS Masonry Fill, Styropor News, Blue 1.04, May 28, 1982, South Brunswick, New Jersey.

BASF Wyandotte Corporation, Surface Coloring of Styropor Expandable Polystyrene, Styropor Technical Bulletin S–4, South Brunswick, New Jersey.

United States Borax & Chemical Corporation, TIM–BOR for Wood Preservation Treatment Manual, 1986, Los Angeles, California.

* cited by examiner

*Primary Examiner*—Morton Foelak
(74) *Attorney, Agent, or Firm*—Reinhart Boerner Van Deuren S.C.

(57) ABSTRACT

An insect resistant foam building material includes calcium borate incorporated therein in sufficient quantity to provide insect resistance. Calcium borate may be incorporated in expanded polystyrene or extruded polystyrene foam materials as part of the foam manufacturing process. The resulting insect resistant calcium borate infused foam material is non-toxic to humans and resistant to leaching out of the protective calcium borate compound from the foam material under high moisture conditions.

24 Claims, 2 Drawing Sheets

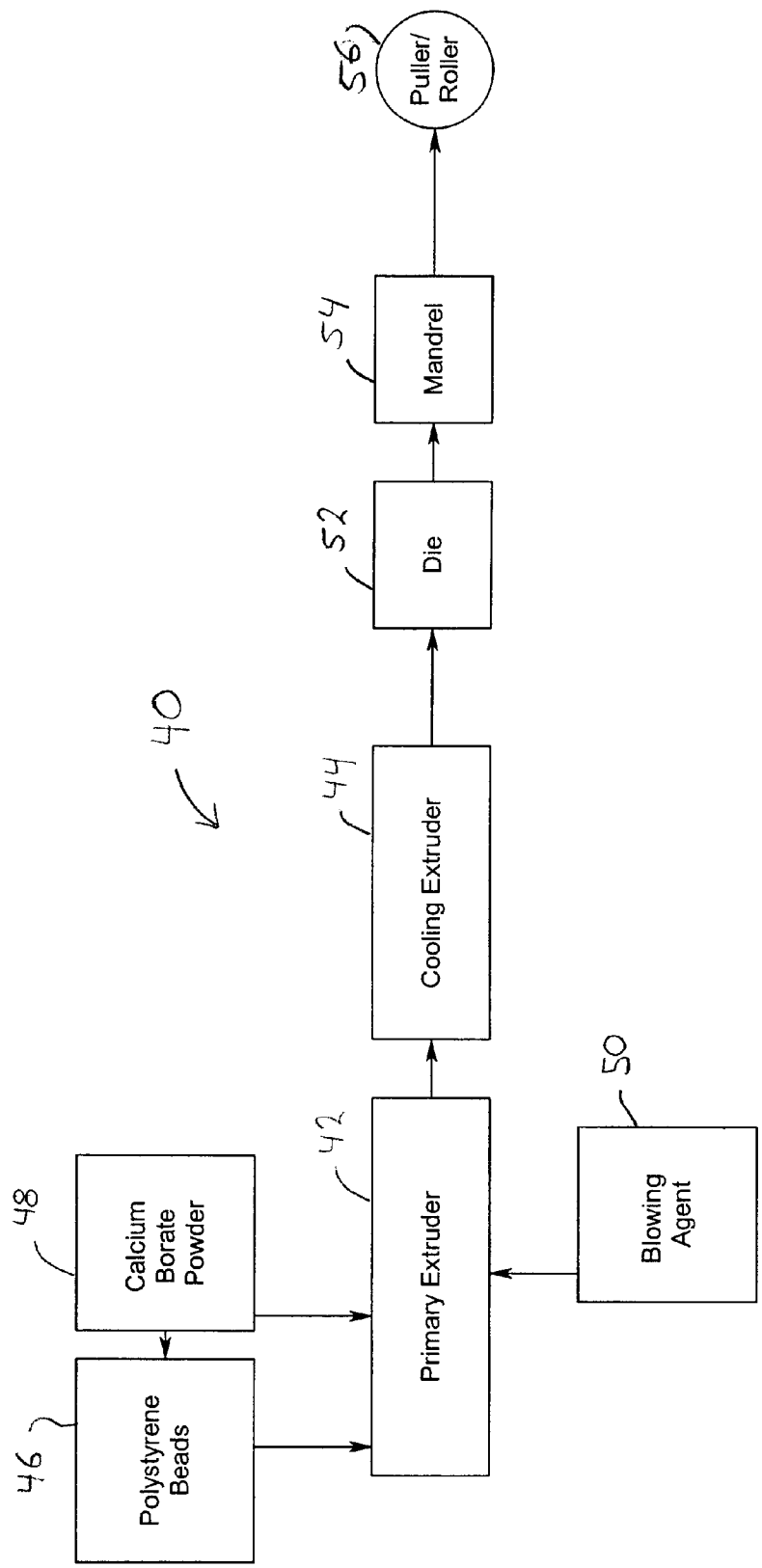

CALCIUM BORATE INFUSED FOAM BUILDING MATERIALS AND THE LIKE AND METHOD OF MAKING SAME

FIELD OF THE INVENTION

The present invention pertains generally to building and construction materials, and, more particularly, to foam building materials, such as expanded polystyrene (EPS) and extruded polystyrene (XPS) materials, and to methods and devices for imparting insect resistance, such as termite resistance, to such materials.

BACKGROUND OF THE INVENTION

From the moment that a building or other structure is constructed, the building materials that form the structure are subject to attack from various environmental conditions. Weather, insects, fungi, and fire are continuous threats to the longevity, safety, and efficient operation of buildings. For example, insect infestation, such as infestation by termites, if uncontrolled, can cause severe damage to wood structure buildings.

Various methods have been employed to protect buildings and other structures from potential damage due to environmental and other conditions. A typical protective method involves treating the building materials from which the building or structure is built to resist attacks from various environmental and other conditions. For example, it is widely known that chromated copper arsenate (CCA) solutions may be used to treat wood building materials under high pressure. CCA treated wood is weather resistant, highly insect and fungi resistant, and, therefore, has a very long life. However, CCA treated wood is so highly insecticidal and fungicidal that it must be handled with considerable care. Recent evidence suggests that CCA treated wood may be harmful not only to insects and fungus, but also to humans and other animals that may come in contact with the CCA treated wood for prolonged periods of time.

As an alternative to CCA treatment, U.S. Pat. No. 6,387,300 to Bosserman describes a method for treating calcium borate ores to obtain useful boron compounds which may, in turn, be used to treat wood and other cellulose products such as plywood and oriented strand board (OSB). It is believed that such a calcium borate based wood treatment may be as effective as CCA as a wood preservative and protection against insect and fungus attack, without posing as significant a potential environmental hazard as CCA treated wood. Furthermore, the calcium borate solution used to treat wood is not water soluble, and thus leach resistant, thereby maintaining the protective properties of the wood treated with such a compound when exposed to various weather conditions such as rain or other precipitation.

In addition to wood, various other materials also commonly are used as building materials in the construction and related industries. For example, various foam products commonly are employed as building materials. Such foam products typically are made of a material such as polystyrene, or similar materials. Polystyrene building materials may be made using a variety of different conventional manufacturing processes, and include expanded polystyrene (EPS) and extruded polystyrene (XPS). Typical applications of such foam building materials include insulation for building foundations, walls, and roofing. Other foam applications include exterior building ornamentation and as a sub-grade displacement material. Sheets of foam building materials may be attached on site to building walls, foundations, etc., or may form the core of prefabricated insulated building panels (e.g., having a core of EPS or other foam material bonded to exterior skins of OSB, plywood, or similar materials). Foam may also be used to produce insulated concrete forms, which are used to provide a form for defining the structure of a poured concrete foundation or other structure and which are maintained in place to provide insulation to the foundation or other structure. Other applications of foam building materials also are known, and the various applications of foam materials in the building construction industry are likely to continue to grow.

Like wood products, foam building materials also are subject to attack from environmental and other conditions. In particular, foam insulation materials are subject to attack from various boring insects, such as termites. Foam insulation materials create a friendly environment for wood boring insects, such as carpenter ants and termites, which bore through the foam insulation to get at adjacent wooden structures. Insect boring through foam insulation reduces the insulating effectiveness of the insulation and, in severe cases, can cause building structural problems.

U.S. Pat. Nos. 5,194,323 and 5,270,108, both to Savoy, describe and illustrate an insulated building panel comprising a core of expanded polystyrene (EPS) foam bonded to at least two exterior skins of, e.g., oriented strand board (OSB). The panel is treated with an insecticidal and fungicidal chemical. The preferred chemical is a borate (salts or esters of boron). In particular, these patents describe the use of a sodium borate treatment chemical in the form of disodium octaborate tetrahydrate ($Na_2B_8O_{13}4H_2O$). Several treatment methods are described, including immersion of the building panel in a solution of the treatment chemical and water, or spraying an aqueous solution of the treatment chemical on the building panel. The treatment process can be applied to the completed building panel or to the panel skins, to plain EPS, or to the building panel core separately. The EPS core may be treated by incorporating the sodium borate treatment chemical in either a dry powder or liquid form into the core during its formation.

Sodium borate treated foam building materials have been found to be resistant to insect and fungicidal attack. However, sodium borate is a water soluble compound. This can be advantageous, in that sodium borate may be mixed as a treatment chemical with water in an aqueous solution for easy application thereof to building materials. However, there is a corresponding limitation of sodium borate treated building materials. Since sodium borate is water soluble, it is important that building materials treated with sodium borate not be exposed to excess moisture or rain after treatment. Such exposure may cause the sodium borate to be leached or washed out from the treated building material, thereby removing the protective properties therefrom.

What is desired, therefore, is a foam building material that has long-term resistance to attack by termites and other insects. Such a foam building material should not pose any hazard to humans or to the environment either during installation thereof or anytime thereafter. Such an insect resistant foam building material also should be treated in such a manner that exposure to precipitation or other sources of moisture do not reduce the effectiveness of the foam building material to resist termites and other insects.

SUMMARY OF THE INVENTION

The present invention provides a foam material, e.g., a foam building material, which includes a calcium borate compound incorporated therein. A calcium borate infused foam material in accordance with the present invention is resistant to attack from termites and similar boring insects. Since calcium borate is a non-water soluble material, the protective properties of calcium borate infused foam materials will not leach out from or otherwise be removed from such insect resistant materials in accordance with the present invention when such materials are exposed to rain or other high moisture conditions. Thus, a calcium borate infused foam material in accordance with the present invention will maintain its insect resistance properties even after being exposed to rain or other high moisture conditions. Calcium borate does not present a health risk to humans, therefore, calcium borate infused foam materials in accordance with the present invention are environmentally friendly and can be handled and used without taking precautions other than those conventionally employed when installing or using untreated foam building materials.

In accordance with the present invention, calcium borate may be infused in any foam material having sufficient physical structure to be used for producing foam building materials, and the like. Polystyrene is a preferred foam material in which calcium borate may be infused in accordance with the present invention. In accordance with the present invention, calcium borate may be infused into expanded polystyrene (EPS) or extruded polystyrene (XPS) during the foam manufacturing process. A calcium borate compound in powdered form, e.g., finely ground colemanite ore, preferably may be employed during the EPS or XPS manufacturing process to provide a selected amount of calcium borate concentration in the resulting foam product. Preferably, a sufficient amount of calcium borate is infused into the foam material during the manufacturing process to impart insect resistant properties to the resulting foam material.

Calcium borate infused foam materials in accordance with the present invention may be molded, cut, or otherwise manufactured into any form for any application in which the insect resistant properties of the material would be useful. For example, a calcium borate infused foam material in accordance with the present invention may be molded, cut, extruded, or otherwise formed or combined with other materials to form various building materials such as sheets of foam insulation, insulated concrete forms, cores for insulated building panels, etc.

Further objects, features, and advantages of the invention will be apparent from the following detailed description, taken in conjunction with the accompanying drawings.

BRIEF DESCRIPTION OF THE DRAWINGS

FIG. 2 is a schematic block diagram of an exemplary system and method for infusing calcium borate into an extruded polystyrene (XPS) foam material in accordance with the present invention.

DETAILED DESCRIPTION OF THE INVENTION

Figure 1:
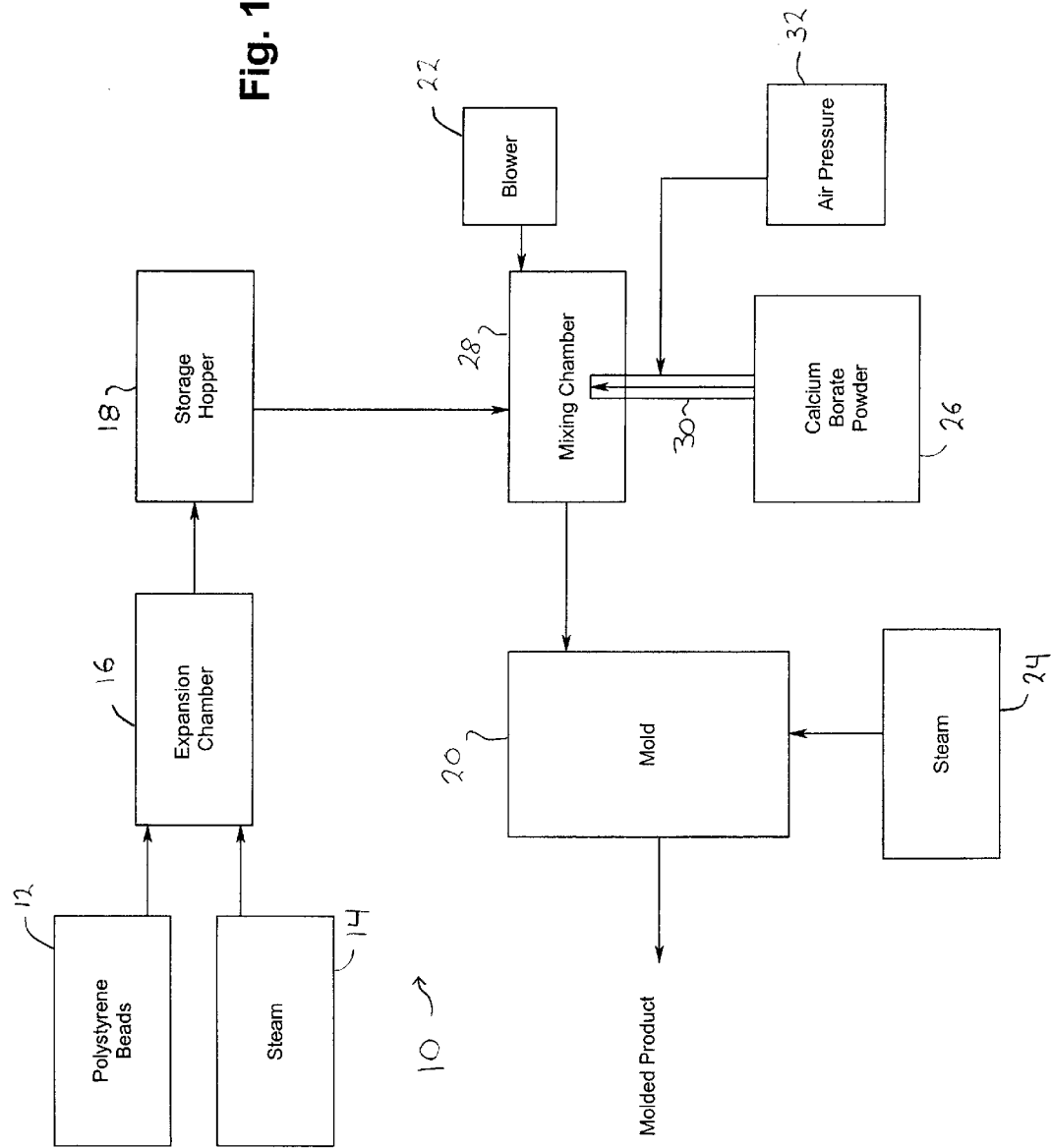
FIG. 1 is a schematic block diagram of an exemplary system and method for infusing calcium borate into an expanded polystyrene (EPS) foam material in accordance with the present invention.

In accordance with the present invention, calcium borate is infused into a foam material that may be used as a building material. (Throughout this application, including in the claims, terms like infused, mixed, incorporated, etc. will be used generically to refer to any method for incorporating calcium borate into a foam material and to any foam material made by such a method.) As will be discussed in more detail below, a calcium borate infused foam material in accordance with the present invention is resistant to damage by boring insects such as termites. Although calcium borate is hazardous to insects such as termites, it is not harmful to humans and other animals. Thus, a calcium borate infused foam material in accordance with the present invention can be manufactured and handled in the field without any special precautions. Furthermore, there is no risk of potential harm to the environment in areas surrounding installations of calcium borate infused foam materials. In addition, since calcium borate is not water soluble, a calcium borate infused foam material in accordance with the present invention is resistant to leaching of the calcium borate from the material when exposed to moisture. Thus, a calcium borate infused foam material in accordance with the present invention maintains its insect resistant properties even if exposed to moisture such as rain. This resistance to leaching also simplifies the storage and shipment of calcium borate infused foam materials in accordance with the present invention. Special precautions need not be taken to protect such materials from excessive moisture during shipment and storage. This may be a particularly important advantage at a building site, where shelter for building materials may not be available.

In accordance with the present invention, calcium borate may be infused into any foam material having sufficient structure to be used as a building material. Polystyrene is a conventional foam building material that may be infused with calcium borate in accordance with the present invention to provide insect resistant properties thereto. The present invention will be described in detail herein with reference to the infusion of calcium borate into polystyrene building materials. It should be understood, however, that the present invention may be applicable to building materials containing either polystyrene or other compositions used to make foam building materials. Furthermore, although the detailed description provided herein will be centered around the manufacturing and testing of calcium borate infused foam building materials in accordance with the present invention, it should be understood that the present invention also is applicable to foam products which may be used in other non-building material related applications. (A non-limiting example of such another non-building material related application of the present invention is insect resistant foam packaging materials). In general, the present invention may find application wherever it is necessary or desired to employ a foam material that is resistant to boring insects such as termites.

In accordance with the present invention, calcium borate preferably is infused into a polystyrene foam material during the polystyrene foam manufacturing process. Two types of polystyrene employed to make building materials and other foam products are expanded polystyrene (EPS) and extruded polystyrene (XPS). In accordance with the present invention, calcium borate may be infused into either EPS or XPS to impart insect resistant properties thereto.

An exemplary process for infusing calcium borate into EPS in accordance with the present invention will now be described with reference to the schematic block diagram 10 of FIG. 1. The exemplary EPS process 10 to be described is only one of potentially many variations on the basic EPS manufacturing process. In the exemplary basic EPS manufacturing process 10, expandable polystyrene beads 12 are combined with a heat source in a preliminary expansion chamber 16. An exemplary heat source is steam 14, although other heat sources may be used. The expandable polystyrene beads 12 generally are round shaped for EPS and crystal shaped for XPS. The term "bead" as used herein, including in the claims, is not meant to refer to any particular shape of the beads. Conventional expandable polystyrene beads 12 are provided by the manufacturer thereof with an agent that causes the expandable polystyrene beads 12 to expand when combined with the steam 14 or other heat source in the expansion chamber 16. Pentane is an exemplary expansion agent that typically is incorporated in expandable polystyrene beads 12 for this purpose. As the polystyrene beads 12 are combined with the steam 14 in the expansion chamber 16, the beads expand to near their final size by the action of the expansion agent. After this initial expansion, the expanded polystyrene is directed from the expansion chamber 16 to a storage hopper 18. The expanded polystyrene is retained in the storage hopper 18 for several hours, to allow the expanded polystyrene beads to stabilize.

In a conventional EPS manufacturing process, the expanded polystyrene is directed from the storage hoppers 18 into a mold 20 for forming into a fully fused or formed EPS mold. Typically, the expanded polystyrene beads may be directed from the storage hopper 18 to the mold 20 via an airflow conveyor. Thus, one or more large blowers 22 typically are provided along a conduit path between the storage hopper 18 and the mold 20 to create sufficient airflow to direct the expanded polystyrene beads from the storage hopper 18 to the mold 20. Once the expanded polystyrene beads are loaded into the mold 20 from the storage hopper 18 a partial vacuum may be created in the mold 20 in addition to steam 24 that is provided into the mold. (Note that the source 24 for providing steam to the mold 20 may be the same as or different from the source 14 for providing steam to the preliminary expansion chamber 16.) Under the vacuum conditions created within the mold 20, the polystyrene beads expand in the presence of the steam to their final size. The heat from the steam in the mold 20 causes the polystyrene beads to become tacky, thereby causing adjacent beads to stick together. A slightly elevated pressure, e.g., 15–20 pounds, is provided to the mold interior 20 to form the final molded product (without crushing the product in the mold).

Depending upon the shape of the mold 20, and the desired end product, the resulting molded product ejected from the mold 20 may be a completed foam product ready for use, or may be subjected to further processing. For example, the mold 20 may produce a single large block or billet of EPS from which sheets of EPS may be cut, e.g., using a conventional hot wire cutter. The sheets of EPS cut from the billet may be used as foam insulation sheets that may be installed in various construction or building product applications. Alternatively, the sheets of EPS cut from the billet may be fabricated further, e.g., sandwiched between sheets of wood or other materials to make structural building panels.

In accordance with the present invention, the addition of calcium borate is incorporated into the process of manufacturing the EPS in a manner such that sufficient calcium borate is distributed throughout the final molded product to provide protection from insects thereto. A preferred source of calcium borate to be introduced into the EPS manufacturing process is a calcium borate powder 26. The calcium borate powder 26 may be provided, for example, as a finely ground borate ore. For example, for the application being described, colemanite ore ground at a grind of 325 mesh was used. The empirical formula for colemanite is: $Ca_2B_6O_{11} \cdot 5H_2O$. Other borate ores that contain calcium naturally also may be used. Such other calcium borate ores include ulexite, pandermite, danburite and datolite.

As will be discussed in more detail below, a sufficient amount of boron must be infused into a foam product to provide protection against insect damage. One factor affecting the amount of boron infused in a foam product in accordance with the present invention is the boron content of the calcium borate powder 26 used in the EPS or other foam manufacturing process. This should be considered in selecting the calcium borate powder 26 employed, as well as the amount of calcium borate powder 26 that is used in the molding of EPS. For example, colemanite obtained from different sources will normally differ somewhat in purity. Therefore, the actual amount of boron and calcium present in a particular amount of colemanite, e.g., one kilogram, obtained from one source will differ somewhat from the amount present in one kilogram obtained from another source. If desired, an ore sample can be assayed in order to determine the amount of calcium and boron present in the particular sample.

In the exemplary EPS manufacturing process in accordance with the present invention being described, the calcium borate powder 26 may be incorporated into the manufacturing process by injecting the calcium borate powder 26 into the flow of expanded polystyrene beads from the storage hopper 18 to the mold 20. Preferably, the calcium borate powder 26 may be injected into a mixing chamber 28 formed along the air flow conveyance path between the storage hopper 18 and the mold 20 which is adjacent to a blower 22. (Note that the mixing chamber 28 may be a specially formed chamber or may simply represent a portion of the air flow conveyance conduit between the storage hopper 18 and the mold 20 which is adjacent to a blower 22.) The adjacent blower 22 creates a high degree of turbulence in the mixing chamber 28, thereby allowing the calcium borate powder 26 to be mixed thoroughly with the polystyrene beads as they pass through the mixing chamber 28 from the storage hopper 18 to the mold 20.

An exemplary system for injecting calcium borate powder 26 into the air/polystyrene bead flow through the mixing chamber 28 is a metered venturi injection system. One or more venturi injection gun(s) 30 may be implemented, each with a tube having a proximal end open into the source of calcium borate powder 26 and a distal end projecting into the mixing chamber 28 for injecting calcium borate powder 26 therein. Pressurized air 32 is injected into the tube 30 along the length thereof and directed toward the open distal end of the tube positioned in the mixing chamber 28. The pressurized air 32 flowing through the tube 30 into the mixing chamber 28 causes a vacuum effect at the open proximal end of the tube 30 disposed in the calcium borate powder 26, thereby drawing the calcium borate powder 26 through the tube 30 and into the mixing chamber 28. The size, flow rate, and number of injection guns 30 employed may be selected and/or controlled to inject the desired amount of calcium borate powder 26 into the mixing chamber 28 to achieve the desired calcium borate concentration in the final molded EPS product.

The foregoing is only one exemplary system for injecting calcium borate powder into the air/polystyrene bead flow to the mold. Any other method of injecting calcium borate powder into the air stream may be employed in accordance with the present invention. For example, a manual, semi-automated, or fully automated system for metering a selected amount of calcium borate powder into the air stream may be used. Whichever method is used, it is preferred that the calcium borate powder be admitted into an area of high agitation or turbulence in the air stream (e.g. adjacent a blower 22). This helps to ensure adequate mixing of the calcium borate powder with the polystyrene beads in the air flow as well as maximizing suspension of the calcium borate powder to minimize machine losses due to the calcium borate powder dropping out of the air stream.

It is important to note that calcium borate powder, e.g., ground colemanite, is quite dense. Therefore, calcium borate powder 26 injected into the air/polystyrene stream from the storage hopper 18 to the mold 20 will tend to drop out of the stream to the bottom of the conduits carrying the polystyrene/calcium borate mixture to the mold 20. Such losses must be considered in determining the amount of calcium borate powder 26 to be injected into the mixing chamber 28 to achieve the desired calcium borate concentration in the final molded EPS product. To minimize such losses, and to assure even mixing of the calcium borate powder 26 with the polystyrene bead as it arrives at the mold 20, the injection of calcium borate powder 26 into the stream of polystyrene beads from the storage hopper 18 to the mold 20 should be performed as close to the mold 20 as possible.

For exemplary purposes only, it was found that injecting approximately 4% calcium borate powder (colemanite) by weight, to compensate for potential machine loss, into the polystyrene bead stream at a close proximity to the EPS mold resulted in a 2.4% boric acid equivalent boron content in the final molded product. As discussed below, this has been found to be a sufficient boron concentration to provide effective termite resistance.

Calcium borate powder (e.g., ground colemanite) is relatively economical. Therefore, sufficient calcium borate may be added to a calcium borate infused foam product in accordance with the present invention to assure adequate insect resistance, and taking into account machine losses, without significantly increasing the cost of manufacturing of the insect resistant foam material. Care should be taken to ensure that such large amounts of calcium borate powder are not added to the foam material so as to affect adversely the structural integrity of the resulting foam product. This may be of particular concern where the insect resistant foam end product is an insulated concrete form, or some other product, where the structural integrity of the insect resistant foam product is of critical importance. It has been found that sufficient calcium borate powder may be included in EPS in accordance with the present invention to provide adequate insect resistance without any noticeable effect on the structural integrity of the foam.

An exemplary method for incorporating calcium borate into XPS in accordance with the present invention will now be described with reference to the schematic block diagram 40 of FIG. 2. Extruded polystyrene foam begins with solid polystyrene crystals. The crystals, along with special additives and a blowing agent, are fed into an extruder. Exemplary common blowing agents are hydrocarbons such as Pentane or fluorocarbons. Within the extruder the mixture is combined and melted, under controlled conditions of high temperature and pressure, into a viscous plastic fluid. The hot, thick liquid is then forced in a continuous process through a die. As it emerges from the die it expands to a foam, is shaped, cooled, and trimmed to dimension. This continuous extrusion process results in a unique foam product with a uniform closed-cell structure, a smooth continuous skin, and consistent product qualities which are unique to XPS and products made therefrom. An exemplary tandem system for direct gas XPS extrusion will be described in more detail below. It should be understood, however, that calcium borate may be incorporated into XPS in accordance with the present invention as made by other extrusion processes.

In the tandem system for direct gas extrusion, a primary extruder 42 is used for melting polystyrene raw materials and mixing the melted materials with a blowing agent. Controlled cooling of the resulting melted and mixed materials is accomplished in a secondary or cooling extruder 44.

The basic raw material used in the XPS process is an appropriate plastic in crystal form, as known to those skilled in the art of XPS manufacturing. Suspension beads, e.g., polystyrene beads 46, or other special shapes also can be used. A nucleating agent, usually in the form of a fine dry powder, is blended with the plastic crystals or beads in a drum tumbler or similar mixer. More sophisticated systems utilizing continuous metering and blending equipment are also available. The nucleating agent controls the cell size and, to that degree, the properties of the resulting XPS foam. Nucleating agents initiate the formation of bubbles by providing an imperfection in the melt where the blowing agent can come out of solution on pressure release at a die exit. Many types of nucleating agents are used, depending on the resin, fineness of cell desired, and the type of blowing agent used. Normally about 0.1% to 1% of these ingredients are used, so the cost is negligible. In accordance with the present invention, calcium borate, e.g., in the form of calcium borate powder 48, as described above, may be combined with the polystyrene 46 and nucleating agent before the resulting dry blend is admitted to the primary extruder 42.

The dry blend, which may include calcium borate powder 48, is fed to the hopper of the primary extruder 42. The primary extruder includes a rotating screw that serves various purposes. The action of the screw continues the mixing of the ingredients and brings the plastic to a homogenous melt at a high pressure and temperature level (e.g., about 3000 PSI and approximately 380° F.) In accordance with the present invention, calcium borate, e.g., in the form of calcium borate powder 48, may be provided directly into the primary extruder 42, to be mixed by action of the primary extruder screw with the melted polystyrene or other plastic therein.

A blowing agent 50 is injected into the melt in the primary extruder 42 by a high pressure metering system. The primary extruder screw is designed to eliminate the forming of gas pockets at the point of injection of the blowing agent gas into the primary extruder 42 and to prevent pressure fluctuations from the screw flights which might back into the blowing agent feed pipes. The amount of blowing agent can vary widely depending on the resin and the type of product desired.

The melt, with blowing agent incorporated therein, is fed under pressure from the primary extruder 42 to a seal throat of cooling extruder 44. The pipe from the primary extruder 42 to the cooling extruder 44 may contain an automatic screen changer for removing any contaminants. The cooling extruder 44 contains a special multi-flighted screw designed for uniform cooling and high capacity heat transfer. This cooling is difficult in that the cooling extruder screw tends to put mechanical energy into the solution as the extruder barrel removes heat. Cooling must be sufficient so that the polymer in the cell wall will support itself after extrusion through a die into the atmosphere. The melt temperature depends on the resin and the type and amount of blowing agent, so it can vary greatly, but is generally in the range of 220° F. to 300° F. More blowing agent requires a lower temperature in order to maintain the viscosity necessary for good extrusion and cell formation.

After proper cooling, the solution extrudes through a die 52 which is attached to the end of the cooling extruder barrel 44. The die 52 puts the extrudate into the proper form, such as profiles or sheet, etc. The die design is critical because of the very viscous melt and the need to provide an orifice that will cause foaming to occur outside the die lips.

The resulting tube of XPS extending from the die 52 is usually extruded horizontally over a cooling drum or mandrel 54 which sizes the sheet width. Internal and external air rings provide cooling. Also, the air supports the XPS as it moves from the die 52 to the cooling mandrel 54 and then helps move the sheet over the mandrel 54 without friction.

The sheet of XPS, which is cool and self-supporting as it leaves the cooling mandrel 54, is slid into one or more webs and pulled by light nip rails or by an s-rap puller 56. The sheet basis weight, that is grams per square centimeter, is determined by the puller speed. The sheet thickness, that is "density", is determined by the amount of bowing agent. Profile extrusions are passed through shaping devices with air or water cooling as required. In the case of sheet extrusion, the web may be wound on large cores, to prevent damage to the sheet and to allow for large roll diameters without excessive speed range. Several types of winders, e.g., turret winders and cantilever winders, are in use.

The resulting XPS product, with calcium borate infused therein in accordance with the present invention, may be further processed in any manner desired to form an insect resistant building or other foam material.

EPS including calcium borate infused therein in accordance with the present invention was fabricated by the method and system 10 described above with reference to FIG. 1. The resulting calcium borate infused EPS was tested to confirm the resistance thereof to termites. The calcium borate infused EPS tested was determined by conventional chemical analysis to contain approximately 2.4% boric acid equivalent (BAE). (BAE is a conventional measurement of boron content. It is boron compounds that provide the actual protection from insects to calcium borate infused foam materials in accordance with the present invention.)

The following procedure was employed to test the insect resistance properties of the calcium borate infused EPS. Fifty cubic centimeters of moist sand/vermiculite substrate were placed in the bottom of each of six 250 ml straight-sided Nalgene jars with screw-cap lids. The ratio used was 75.0:10.9:14.1 sand/vermiculite/water by volume. The sand and vermiculite was heat sterilized at 150° C. for six hours before adding bottled water to mix the moist substrate. The substrate provides a tunneling medium and humidity control for termites. A ¾ in. cube of southern pine sapwood was placed on top of the substrate. A 64 mm diameter "plug" of EPS (having a circumference matching the inner circumference of the jar) was placed on top of the sapwood cube. A second ¾ in. cube of southern pine sapwood was placed above the EPS plug. The EPS samples were heated for 24 hours at 50° C. to drive off entrapped Pentane. The wood cubes were immersed in heated water for six hours to add moisture to them before exposure to termites.

Subterranean termites, Isoptera: Rhinotermitidae Reticulitermes Flavipes Kollar, were collected from the wild. The termites were cleaned of debris on moist paper towels. One hundred worker termites plus a few soldier termites were added to the top chamber of each of the six containers.

The containers were stored in room conditions, 68–88° F., for the 42-day duration of the test. A Para-film seal and the screw caps on the containers were removed periodically to examine the activity of the termites and to add fresh air to each container. Three control replicants (untreated EPS) and three treated replicants (calcium borate infused EPS) were tested in the six containers.

One week into the test, observations indicated that termites had tunneled through two inches of EPS in all three control replicants, and termites were seen in the bottom chamber in one of the control replicants. Many termites were also in the bottom chamber of one of the treated replicants. Three weeks later, all the termites in all three treated replicants appeared to be dead, while termites in all control replicants appeared very active with many termites in the bottom chamber and moving through the untreated EPS to the top chamber. These conditions remained the same until test closure.

At the end of the testing period, each test container was examined for surviving termites in the wood cube and substrate in the top chamber, in the EPS sample, and in the wood cube and substrate in the bottom chamber. No termites survived in the treated replicants containing calcium borate treated EPS. The mean survival for the control replicants was 68.3%. (Survival percentage in each replicant may have been about 5% higher because of the difficulty of extracting all of the live termites from the numerous tunnels within the EPS.) Termites made numerous tunnels in the untreated EPS but very few in the treated EPS.

A similar test was performed with calcium borate infused EPS having an approximately 0.5% boric acid equivalent (BAE). Although this test was inconclusive, initial observations indicated that a BAE concentration in the EPS of greater than 0.5% may be required to achieve effective termite resistance.

It is noted that laboratory test results only offer an indication of the actual effectiveness of calcium borate infused foam materials in actual field applications, such as building materials actually used in building construction. Experience with other methods for treating EPS for insect resistance has shown that treated EPS having only limited effectiveness on tunneling and survival of insects in laboratory tests nevertheless significantly limited damage to EPS and wood above it when exposed in the field, where termites have a choice of going somewhere else besides through treated EPS. Thus, lesser concentrations of calcium borate in calcium borate infused foam materials in accordance with the present invention than those indicated above may provide effective insect resistance in actual field applications.

A calcium borate infused foam material in accordance with the present invention thus preferably includes a sufficient amount of calcium borate incorporated therein to provide insect resistance to the material. Preferably, a sufficient amount of calcium borate is incorporated in a foam material in accordance with the present invention to provide at least approximately 0.5% boric acid equivalent, and, more preferably, at least approximately 2% boric acid equivalent, in the foam material. Preferably, a sufficient amount of calcium borate is incorporated in a foam material in accordance with the present invention to provide between approximately 0.5% and 2.5% boric acid equivalent in the foam material. Greater or lesser amounts may, however, be used.

As mentioned above, it is the boron compounds in calcium borate that provide the actual protection against insects of calcium borate infused foam materials in accordance with the present invention. (Boron kills bacteria in the termite's intestinal tract, which then kills off the enzymes which then kills off the protozoa (that digest the wood ingested by the termite) which kills the termite.) However, these boron compounds must be provided in a matrix that substantially reduces their ability to leach out under commonly encountered environmental conditions, such as high humidity, rain, fog, and exposure to soil moisture and dew. Calcium is believed to act as a fixative agent in the calcium borate matrix to increase dramatically the resistance of foam materials in which the calcium borate is incorporated to the leaching out of the boron compounds. Thus, calcium borate infused foam materials in accordance with the present invention provide much superior protection against the leaching out of protective boron compounds from the foam than is provided in foam materials treated with sodium borate compounds.

It is understood that the present invention is not limited by the particular exemplary applications, embodiments, and methods of manufacture described herein, but embraces all variations thereof as come within the scope of the following claims.

What is claimed is:

1. A method for forming an insect resistant polystyrene foam material, comprising:
    a) providing polystyrene beads via an air stream to a mold;
    b) adding a calcium borate powder to the air stream of polystyrene beads to be mixed at any point with the polystyrene beads before entering the mold; and
    c) forming the insect resistant polystyrene foam material from the mixed calcium borate powder and polystyrene beads in the mold.

2. The method of claim 1 wherein the calcium borate powder added to the air stream of polystyrene beads is a powdered calcium borate ore.

3. The method of claim 2 wherein the powdered calcium borate ore is powdered colemanite ore.

4. The method of claim 2 wherein the powdered calcium borate ore is a calcium borate ore ground to an optimal particle size of approximately 325 mesh.

5. The method of claim 1 wherein adding calcium borate powder to the air stream of polystyrene beads includes injecting calcium borate powder into the air stream using air powered injection.

6. The method of claim 1 wherein adding calcium borate powder to the air stream of polystyrene beads includes adding the calcium borate powder to an area of high turbulence in the air stream.

7. The method of claim 1 wherein providing polystyrene beads via an air stream to the mold includes:
    a) providing expandable polystyrene beads to an expansion chamber;
    b) combining the expandable polystyrene beads with a heat source in the expansion chamber to expand the expandable polystyrene beads to form expanded polystyrene beads;
    c) conveying the expanded polystyrene beads to a storage container; and
    d) providing the expanded polystyrene beads from the storage container to the mold via the air stream.

8. The method of claim 7 wherein the heat source is steam.

9. The method of claim 1 wherein forming the insect resistant polystyrene foam material in the mold includes combining the mixed calcium borate powder and polystyrene beads in the mold with steam and controlling the pressure in the mold to form the insect resistant polystyrene foam material from the mixed calcium borate powder and polystyrene beads.

10. The method of claim 1 wherein the insect resistant polystyrene foam material formed in the mold is a block of insect resistant polystyrene foam material and comprising additionally cutting the block of insect resistant polystyrene foam material into insect resistant polystyrene foam products.

11. The method of claim 10 wherein cutting the block of insect resistant polystyrene foam material into foam products includes cutting the block of insect resistant polystyrene foam material using a hot wire cutter.

12. The method of claim 1 wherein sufficient calcium borate powder is added to the air stream of polystyrene beads to provide at least approximately 0.5% boric acid equivalent in the insect resistant polystyrene foam material formed in the mold.

13. The method of claim 1 wherein sufficient calcium borate powder is added to the air stream of polystyrene beads to provide at least approximately 2% boric acid equivalent in the insect resistant polystyrene foam material formed in the mold.

14. The method of claim 1 wherein sufficient calcium borate powder is added to the air stream of polystyrene beads to provide between approximately 0.5% and 2.5% boric acid equivalent in the insect resistant polystyrene foam material formed in the mold.

15. An insect resistant foam material, comprising:
    (a) an expanded polystyrene foam material; and
    (b) calcium borate incorporated in the expanded polystyrene foam material in a sufficient amount to provide insect resistance to the foam material.

16. The insect resistant foam material of claim 15 wherein the calcium borate incorporated in the expanded polystyrene foam material is sufficient to provide at least approximately 0.5% boric acid equivalent in the foam material.

17. The insect resistant foam material of claim 15 wherein the calcium borate incorporated in the expanded polystyrene foam material is sufficient to provide at least approximately 2% boric acid equivalent in the foam material.

18. The insect resistant foam material of claim 15 wherein the calcium borate incorporated in the expanded polystyrene foam material is sufficient to provide between approximately 0.5% and 2.5% boric acid equivalent in the foam material.

19. The insect resistant foam material of claim 15 wherein the foam material is formed as a building material.

20. The insect resistant foam material of claim 19 wherein the foam material is formed as a sheet of insect resistant foam insulation.

21. An insect resistant foam material, comprising:
    (a) an extruded polystyrene foam material; and
    (b) calcium borate incorporated in the extruded polystyrene foam material in a sufficient amount to provide insect resistance to the foam material.

22. The insect resistant foam material of claim 21 wherein the calcium borate incorporated in the extruded polystyrene foam material is sufficient to provide at least approximately 0.5% boric acid equivalent in the foam material.

23. The insect resistant foam material of claim 21 wherein the calcium borate incorporated in the extruded polystyrene foam material is sufficient to provide at least approximately 2% boric acid equivalent in the foam material.

24. The insect resistant foam material of claim 21 wherein the calcium borate incorporated in the extruded polystyrene foam material is sufficient to provide between approximately 0.5% and 2.5% boric acid equivalent in the foam material.

* * * * *